Dec. 1, 1925.  
L. BÉLUGOU  
1,563,463  
PHOTOGRAPHIC APPARATUS FOR CHECKING THE AIMING AND FIRING OPERATIONS ON BOARD AIRCRAFT  
Filed Dec. 21, 1923  
2 Sheets-Sheet 1
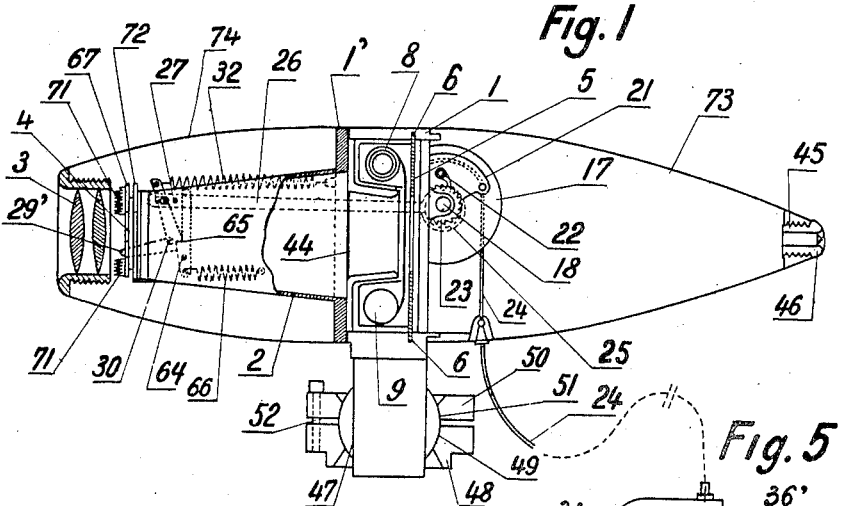
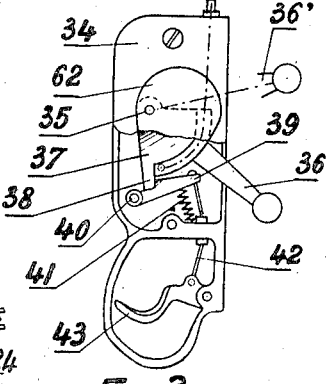
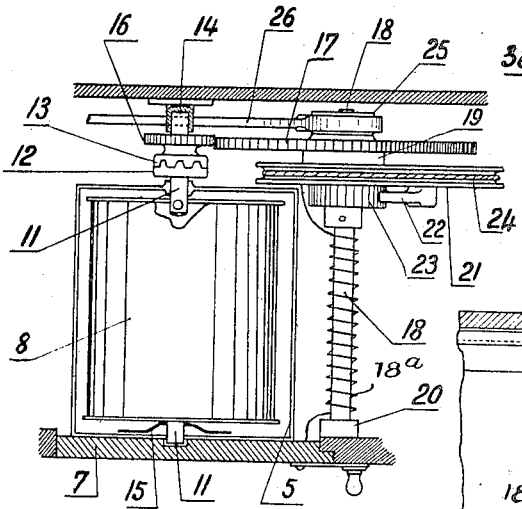
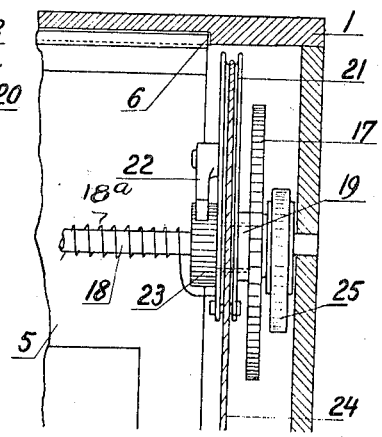
Inventor  
L. Bélugou  
By Marks & Clerk  
Attys.

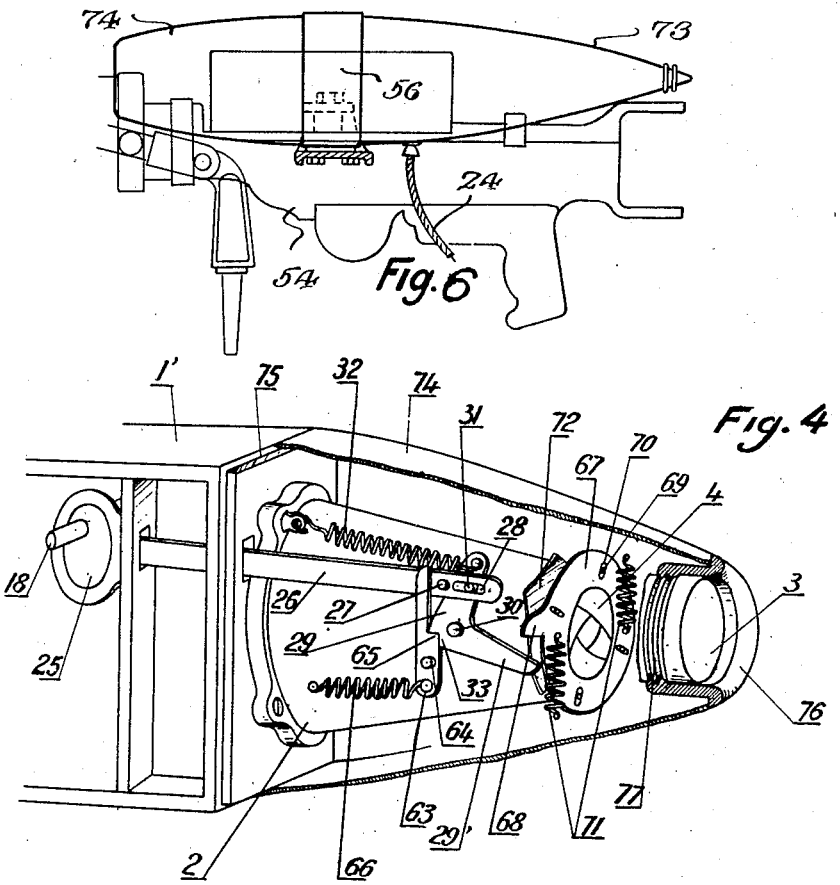

Patented Dec. 1, 1925.

1,563,463

UNITED STATES PATENT OFFICE.

LÉON BÉLUGOU, OF PARIS, FRANCE.

PHOTOGRAPHIC APPARATUS FOR CHECKING THE AIMING AND FIRING OPERATIONS ON BOARD AIRCRAFT.

Application filed December 21, 1923. Serial No. 682,061.

*To all whom it may concern:*

Be it known that I, LÉON BÉLUGOU, engineer, and citizen of the French Republic, residing at 8 Rue Theodore de Banville, Paris, France, have invented certain new and useful Improvements in Photographic Apparatus for Checking the Aiming and Firing Operations on Board Aircraft, of which the following is a specification.

My invention relates to a photographic apparatus which serves especially to control the aiming and firing operations upon aircraft, for the training of persons occupied with handling machine guns on board.

The said apparatus comprises a bobbin holding the photographic film, and the latter is unwound by distant control through the medium of the cable serving to operate the shutter. This single cable successively sets and releases the shutter, whose motion, as in the known devices, is to take place in two stages by reason of the high speed of operating, and the shutter is only released when the control devices of the mechanism have returned to the inoperative position. The cable is controlled by two levers, i. e. a release lever and a setting or engaging lever, both of which are within reach of the gunner.

The photographic apparatus has externally the shape of a solid of streamline construction offering the minimum resistance to the air, so as not to interfere with the proper aerodynamic qualities of the aeroplane. My said invention further relates to suitable devices for the mounting and adjustment of the photographic apparatus, the same being mounted either directly on the avion or upon a machine gun or a pair of like machine guns.

An embodiment of the invention is shown by way of example in the appended drawings.

Fig. 1 is a sectional elevation of the whole apparatus.

Fig. 2 is a partial plan view, on a larger scale.

Fig. 3 is a partial cross-section showing the film unwinding device.

Fig. 4 is a perspective view of the shutter control.

Fig. 5 is an elevational view of the control levers of the apparatus, with parts broken away.

Fig. 6 is a side view showing the mounting of the photographic apparatus upon a machine gun.

My said apparatus comprises a rectangular box made in two parts 1 and 1' fitted together; the rear part 1 supports the mechanism for the control of the film and of the shutter which is described hereunder, while the front part 1' supports the tapered dark chamber 2, the lens 3 and the shutter which is shown diagrammatically at 4, Fig. 1. Within the said box is disposed a frame 5 slidable in the transverse guides 6, Figs. 1 and 3, and it can be introduced or removed through a lateral door 7, Fig. 2. The frame 5 carries the bobbins 8 and 9 for the film 10. The shaft 11 of the driving bobbin 8, Fig. 2, ends in a clutch disc 12 coacting with a like disc 13 mounted on the end of the short axle 14 rotating in bearings secured to the box 1. The clutch action is ensured by the spring 15 which brings together the discs 12 and 13. To the axle 14 is keyed pinion 16 engaging a gear wheel 17 keyed to the end of the shaft 18 which rotates in the bearings 19 and 20.

Upon the shaft 18 is loosely mounted a pivoting quadrant 21 having upon one side the pawl 22 coacting with a ratchet wheel 23 keyed to the shaft 18; to said quadrant is attached the end of a flexible cable which operates in a flexible sheath 24 of the Bowden type and whose outer end is attached to the control levers to be further described. A coil spring 18ª is mounted upon shaft 18. One of its extremities is attached to casing and the other to pivoting quadrant 21 so as to urge said quadrant back to its initial position when no traction is exerted on cable. To the shaft 18 is also keyed the eccentric disc 25, Fig. 4, co-operating with the head of the connecting rod 26 extending towards the lens 3 and disposed at one side of the apparatus. The said lens is mounted at the small end of the cone 2 which latter is suitably centered and is fitted at the large end to the said box part 1' of the device. The outer end of said connecting rod is provided with the stud 27 and is pierced with the slot 28.

A bell-crank 29 is pivoted to the axle 30; one arm of said bell-crank, which is provided with a stud engaging the slot 28, has attached thereto a reaction spring 32 whose other end is secured to the large end of the cone 2; the other arm 29 of the crank forms a toe 29' whose use will be further explained; the said bell-crank has formed at the middle part a notch 33. A release lever 63 is pivoted to the axle 64 and has formed thereon the projection 65 engaging the notch 33 in said bell-crank; the upper part of said release lever is adapted to engage the stud 27 on the connecting rod 26 at one end of the stroke of the latter; to the lower end of the release lever situated below the axle 64 is attached a reaction spring 66 whose other end is secured to the large base of the cone 2.

A ring 67 is revoluble on the centre line of the apparatus, and is provided at the periphery with a projection 68 co-operating with the toe 29' of the bell-crank 29; said ring carries the several flat sections of the shutter 4, each section having a stud 69 traversing a radial slot 70 in the said ring; reaction springs 71 attached to the ring 67 urge the shutter into the closed position. At the rear of the said ring is disposed a stationary cam 72 co-operating with the movable toe 29', and the raised part of the cam will lift the said toe in a direction perpendicular to the plane of the lever 29.

The operation is as follows:

When the cable 24 is drawn upon by means of a control to be further described, the quadrant 21 will pivot and will turn the shaft 18 through the medium of the pawl 22 and the ratchet 23; the connecting rod 26—see Fig. 4—is driven forward by the eccentric 25; the rear end of the slot 28 acts upon the stud 31, thereby pivoting the bell-crank 29 and stretching the spring 32. The projection 33 of said bell-crank will engage the notch 65 in the release lever 63, thus holding the bell-crank 29 in the set position co-operating with the spring 66. The toe 29' has now moved below the projection 68 of the ring 67, Fig. 4.

The second part of the operation is effected by the return of the elements to the initial position due to the reaction springs which were stretched during the forward stroke. The connecting-rod 26, moved by the eccentric 25 and spring 18ª, will return to the initial position without causing any movement of the mechanism, until the stud 27 comes into contact with the lever 63 at the end of the stroke; the latter now swings on its pivot 64 and allows the notch 33 to be released from the said bell-crank; the latter when thus disengaged is brought back abruptly by the spring 32, and the toe 29' engages the projection 68 of the ring 67; the latter now pivots about, stretching the spring 71, and the shutter opens. When the full opening is attained, the toe 29' comes into contact with the raised part of the cam 72 and will thus mount over the projection 68. The ring 67 thus set free will return abruptly to the rear under the action of the springs 71, and the shutter now closes. During this time the lever 63 has returned to the initial position under the effect of the spring 66, and is ready to engage the notch in the said bell-crank when the cable is again drawn upon.

On the other hand, during this forward stroke the gear wheel 17 keyed to the shaft 18 will act through the medium of the pinion 16 to rotate the film bobbin 8; the latter moves solely in the forward direction, and with an intermittent motion, at each forward stroke of the quadrant 21. Since on the other hand the shutter device is only released when the elements of the mechanism have returned to the initial position, this operation can be performed in the best conditions and with all the desired speed.

The control device for the cable 24 may be constituted as shown in Fig. 5. Within the box 34 is pivoted at 35 a control lever 36 secured to a quadrant 37 to which is attached the end of the cable 24; upon the said quadrant is formed the toe 38 coacting with a small arm 39 pivoted on the axle 40 and controlled by a spring 41. To the end of the said arm is attached a small section of cable 42 secured at the other end to a trigger 43. The operation is as follows. In the position shown in Fig. 5, the control lever 36 is in the cocked position, and in order to act upon the cable 24 it suffices to press the trigger so as to draw back the arm 39 and thus release the toe 38, and the lever 36 through traction exerted by cable drawn back by spring 18ª, now assumes the position 36' shown in dotted lines. Under the action of the spring 41, the arm 39 at once returns to the position shown in Fig. 5; to again cock the device, the lever 36 is operated by hand so as to engage the toe 38 with the said arm.

The mechanism above described is completed by the following detail parts:

Forwardly of the films 10, at 44, I dispose a pair of cross-wires which are used in the sighting; at the rear of the apparatus is provided a sighting aperture 45 normally closed by a screw plug 46, and used for sighting on the ground when making the initial adjustment of the apparatus; it provides for the direct observation of the image in the focal plane and for locating the image with reference to the cross-wires 44.

The rear part of the apparatus is contained within a protecting hood 73 whose outer portion has a stream line construction; the front part of the apparatus is surrounded by a hood 74 of stream line construction whose rear end is mounted on a rabbet 75 at the front part of the box 1, 1', and is secured in place by means of a nut 76 screwed upon the mounting 77 of the lens 3.

The camera lens can be secured to the aeroplane for example in the following manner in order to regulate its position with facility. The hood 73, Fig. 1, is secured to a large-sized ball portion 47 co-operating with a socket ring 48 recessed at 49; an upper ring 50 recessed in like manner at 51 is connected therewith by screws 52, thereby securing the whole apparatus in position.

Fig. 6 shows the method of mounting my said photographic apparatus upon a machine gun 54; the camera is represented by its hood 73, 74.

In this arrangement the camera elements are preferably controlled by the device for the cocking and the release of the gun, so that the gunner will be enabled to actually fire the gun and to take a view of the results of the firing at the same time, for the subsequent checking of the aiming operations.

A visible indicating device can be provided upon the box 34, Fig. 5 and in view of the gunner, and it comprises a zero-setting arrangement whereby the number of photographs taken or remaining to be taken may be ascertained at any time.

What I claim is:

1. A photographic apparatus specially intended for the training of gunners on board aircraft, comprising a shutter, shutter-controlling means, a cable for actuating the said means, a control for the said cable disposed at a distant point, two film bobbins whereof one is positively actuated, a device for actuating the latter bobbin, said device being controlled by the said cable, and means whereby the said cable successively effects the setting and the release of the said shutter.

2. A photographic apparatus specially intended for the training of gunners on board aircraft, comprising a shutter, shutter-controlling means, a cable for actuating the said means, a control for the said cable disposed at a distant point, two film bobbins whereof one is positively actuated, a device for actuating the latter bobbin, said device being controlled by the said cable, and means whereby the said cable successively effects the setting and release of the said shutter, and means whereby the said setting is effected when the control elements are returning to their initial position and the said release shall be effected only when all of the said control elements have returned in their said initial position.

3. A photographic apparatus specially intended for the training of gunners on board aircraft, comprising a shutter, a controlling cable, a pivoting shaft having the end of said cable attached thereto, elastic means for bringing shaft back to initial position, an eccentric disc keyed to the said shaft, a connecting rod pivoted to said disc, a pivoting bell-crank engaging the said connecting rod during the forward stroke of the latter and serving to control the said shutter, a spring mounted upon said bell-crank and stretched during the forward stroke, a pivoting release lever coacting with the said bell-crank, a reaction spring for said release lever, a stud mounted upon the said connecting rod and engaging the said release lever during the return stroke of the connecting rod, a stationary cam engaging the said bell-crank and releasing the same, a control for the said cable disposed at a distant point, two film bobbins whereof one is positively actuated, and a device for actuating the latter bobbin, said device being controlled by the said cable.

In witness whereof I have hereunto set my hand.

LÉON BÉLUGOU.